United States Patent
Johnson et al.

(10) Patent No.: US 12,443,969 B2
(45) Date of Patent: Oct. 14, 2025

(54) SYSTEM AND METHOD OF DISTRIBUTING DIGITAL COUPONS OR PROMOTIONAL DATA, BY USING AUGMENTED REALITY (AR)

(71) Applicant: Z Industries Ltd, Derby (GB)

(72) Inventors: Rhys Johnson, Leighton Buzzard (GB); Odighonin Olali, Micklefield (GB)

(73) Assignee: Z Industries Ltd, Derby (GB)

( * ) Notice: Subject to any disclaimer, the term of this patent is extended or adjusted under 35 U.S.C. 154(b) by 54 days.

(21) Appl. No.: 18/234,906

(22) Filed: Aug. 17, 2023

(65) Prior Publication Data
US 2025/0061477 A1    Feb. 20, 2025

(51) Int. Cl.
| | | |
|---|---|---|
| G06Q 30/02 | (2023.01) | |
| G06Q 30/0207 | (2023.01) | |
| G06Q 30/0251 | (2023.01) | |
| G06T 19/00 | (2011.01) | |

(52) U.S. Cl.
CPC ..... *G06Q 30/0222* (2013.01); *G06Q 30/0253* (2013.01); *G06T 19/006* (2013.01)

(58) Field of Classification Search
CPC ........... G06Q 30/0222; G06Q 30/0253; G06Q 30/0207–30/0277
See application file for complete search history.

(56) References Cited

U.S. PATENT DOCUMENTS

| | | | | |
|---|---|---|---|---|
| 9,390,563 | B2 | 7/2016 | Hart | |
| 10,387,912 | B2* | 8/2019 | Farshori | G06Q 30/0253 |
| 11,532,014 | B2* | 12/2022 | Farshori | G06Q 30/0267 |
| 2014/0100994 | A1* | 4/2014 | Tatzel | G06Q 30/0276 |
| | | | | 705/27.1 |

(Continued)

FOREIGN PATENT DOCUMENTS

| | | |
|---|---|---|
| KR | 1020130026583 A | 3/2013 |
| KR | 101613278 B1 | 4/2016 |
| WO | 2015079431 A1 | 6/2015 |

OTHER PUBLICATIONS

Sohn, Tim; "How Newspapers Can Make Augmented Reality Sexy (and Profitable)", MediaShift, 2016, available at <https://mediashift.org/2013/06/how-newspapers-make-augmented-reality-sexy-profitable/>, p. 8.

(Continued)

*Primary Examiner* — Thuy N Nguyen
(74) *Attorney, Agent, or Firm* — Gearhart Law LLC

(57) ABSTRACT

A distribution system and apparatus includes a data processing base module containing information representing customers, and a data processing promotion module containing promotional data. A data processing store module contains information regarding saleable items available for purchase by the customers. A data processing augmented reality module contains visual overlays for images corresponding to saleable items contained in the store module. The augmented reality module provides a visual overlay to appear on a screen of a camera when a customer directs the camera of a mobile device at a desired saleable item contained in the store module. The base module tracks whether the customer views a predetermined minimum number of visual overlays such that if the minimum number is viewed, then the promotional module sends promotional data to the customer.

16 Claims, 17 Drawing Sheets

(56) References Cited

U.S. PATENT DOCUMENTS

| | | | | |
|---|---|---|---|---|
| 2014/0100996 | A1* | 4/2014 | Klein | G06T 1/00 |
| | | | | 705/27.2 |
| 2014/0100997 | A1* | 4/2014 | Mayerle | G06T 19/006 |
| | | | | 705/27.2 |
| 2014/0214547 | A1* | 7/2014 | Signorelli | G06Q 30/0267 |
| | | | | 705/14.64 |
| 2015/0015609 | A1* | 1/2015 | Plasse | H04W 4/02 |
| | | | | 345/633 |
| 2016/0012498 | A1* | 1/2016 | Prasad | G06Q 30/0185 |
| | | | | 705/26.1 |
| 2017/0032382 | A1* | 2/2017 | Shulman | G06K 7/10861 |
| 2017/0236142 | A1* | 8/2017 | Sarin | G06Q 30/0283 |
| | | | | 705/14.25 |
| 2019/0266663 | A1* | 8/2019 | Keeler | G06Q 30/0643 |
| 2021/0398163 | A1* | 12/2021 | Nelsen | G06Q 30/0229 |
| 2022/0058234 | A1* | 2/2022 | Schneider | G06Q 50/184 |
| 2022/0148056 | A1 | 5/2022 | Dixon, Jr. | |
| 2022/0245671 | A1* | 8/2022 | Heeter | H04W 12/77 |
| 2022/0392172 | A1* | 12/2022 | Focke | G06V 10/225 |
| 2024/0005346 | A1* | 1/2024 | Woo | G06N 20/00 |
| 2025/0061477 | A1 | 2/2025 | Johnson et al. | |

OTHER PUBLICATIONS

"Augmented Realty: Tomorrow's World", TechMonitor, Mar. 5, 2012, available at <https://www.techmonitor.ai/technology/software/augmented-reality-tomorrows-world-060312>, p. 8.

"How to Boost Your Indoor Brand Campaign With WebAR", Jan. 30, 2020, USA, available at <https://www.linkedin.com/pulse/how-boost-your-indoor-brand-campaign-webar-leen-segers>, p. 8.

* cited by examiner

SYSTEM AND METHOD OF DISTRIBUTING DIGITAL COUPONS OR PROMOTIONAL DATA, BY USING AUGMENTED REALITY (AR)

FIELD OF THE EMBODIMENTS

The field of the innovative process plus its embodiments relate to a system and method of distributing digital coupons or promotional data, by using augmented reality (AR), and the system and method may be used with mobile devices or any device that harnesses AR tech such as AR Glasses.

BACKGROUND OF THE EMBODIMENTS

This process is directed to shortcomings in distribution in the Coupons industry and how it affects the relatively low redemption rates of coupons (8-16%). These limitations have two facets. One facet is that businesses face an issue in distributing coupons in front of the right customers. The other facet relates to the ease of access to coupons that the consumer needs at the time of purchase, being limited.

With regards to the issue facing businesses, distributing coupons efficiently is very complex and reliant on a number of differing variables. These variables include but are not limited to: access via different payment transactions; lack of a channel solely dedicated to distribution; and a two-tiered payment process for paid coupons. The consequence of this is the development of two coupon models, the paid and free. The paid coupon model is inherently flawed as the customer is paying for a discount to purchase a desired product. The idea being they are incentivised to purchase more lucrative products or services, and the probability of the coupon being redeemed is increased as a result of the commitment of the customer to the initial discount payment. Yet this tends to elicit two reactions from the customers: those who will pay and follow through to their end service or product, and those who will not pay or will not follow through as this payment is another obstacle to their end product or service. This creates a two-tiered purchase process that will only work for certain products, services and business purposes.

The free coupon model, despite its traditional framework, is even less efficient. This is due to its purpose which is time oriented such as for "sales promotions (seasonal etc.)," "inventory clearance" and "inducing trial or user acquisition." Hence the margin of success is low for the business as the customers drawn are not necessarily loyal to their brand or service but taking a short term interest due to opportunity; that is if they should take it in time.

On the consumer side, the issue is the scarcity of straightforward access to coupons that they need at their time of purchase. There is a substantial sum of consumers who forget that they even have a coupon when they get to the point of sale. In addition the market and range of coupons are too wide and disorganised for consumers to navigate efficiently.

There is more structure in the organized retail sector but consumer access to coupons remains an issue, especially when shopping in-store or where the medium of coupon distribution is out of their control. The most important change for consumers is that with the transition from printed to digital coupons, they lost an element of control of the process. Despite the fact that printed coupons are a relic of the past, they allowed the consumer more control of the coupon usage. Where the consumer controls the process, i.e. getting discounts for items and brands they are actively willing to purchase, they are usually paid coupons. Where it is a passive or indiscriminate purchase, the coupon is usually free.

SUMMARY OF THE EMBODIMENTS

The present process and its embodiments relate to a system and apparatus that enables customers to obtain digital coupons or other promotional data shortly before purchasing a product or service with the use of a mobile device having a camera such as a smartphone. The system and apparatus employs augmented reality by adding visual overlays to the view through the camera. This by definition increases the ambit of the process to encompass any AR device including AR glasses; where the added visual overlays will be viewed through the glasses. These overlays add content to the true image seen through the camera. The added content is intended to entice the customer to purchase the product or service. If the customer views a sufficient number of the visual overlays, then the customer is awarded a coupon or other promotional data that provides a discount towards the purchasing of the product or service to which the visual overlays are directed.

A system and apparatus for distributing digital coupons or other promotional data includes a data processing base module containing information representing customers, and a data processing promotion module containing promotional data such as digital coupons. A data processing store module contains information regarding saleable items available for purchase by the customers. A data processing augmented reality module contains visual overlays for images corresponding to saleable items contained in the store module. In the same vein, the augmented reality module provides a visual overlay to appear on the lenses of AR Glasses, when the consumer directs the lenses at a desired saleable item contained in the store module. The augmented reality module provides a visual overlay to appear on a screen of a camera when a customer directs the camera of a mobile device at a desired saleable item contained in the store module. The base module tracks whether the customer views a predetermined minimum number of visual overlays such that if the minimum number is viewed, then the promotional module sends promotional data to the customer.

DESCRIPTION OF THE PREFERRED EMBODIMENTS

Figure 1:
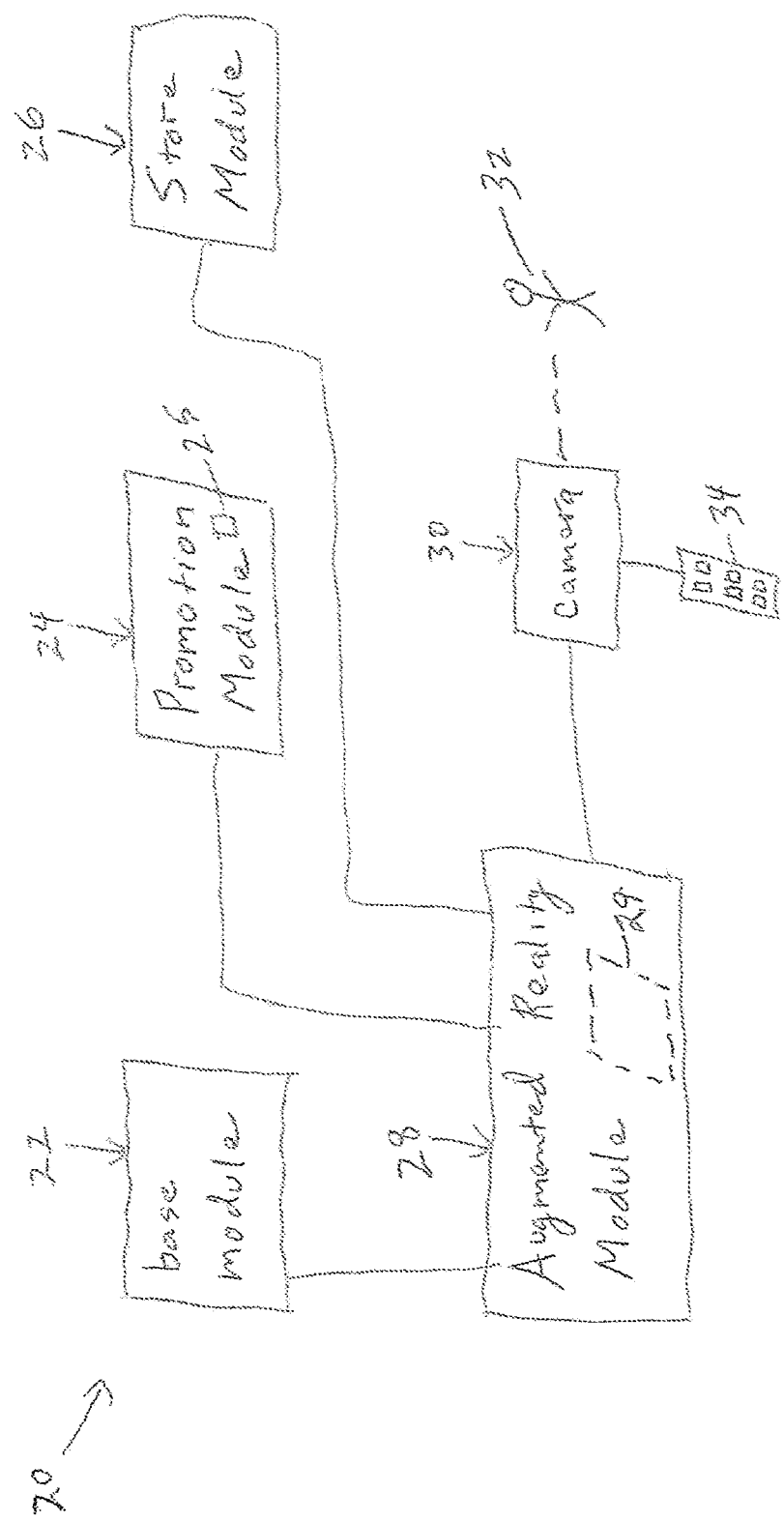
FIG. 1 is a block diagram of the System and Method of Distributing Digital Coupons or Promotional Data, by Using Augmented Reality (AR) of the present process, the components of the system and apparatus being shown schematically, according to at least some embodiments described herein.

The preferred embodiments of the present process will now be described with reference to the drawings. Identical elements in the various figures are identified with the same reference numerals.

Reference will now be made in detail to each embodiment of the present process. Such embodiments are provided by way of explanation of the present process, which is not intended to be limited thereto. In fact, those of ordinary skill in the art may appreciate upon reading the present specification and viewing the present drawings that various modifications and variations can be made thereto.

As used herein, the singular forms "a," "an," and "the," are intended to include the plural forms as well, unless the context clearly indicates otherwise.

The phrase "and/or," as used herein in the specification and in the claims, should be understood to mean "either or both" of the elements so conjoined, i.e., elements that are conjunctively present in some cases and disjunctively present in other cases. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the term "about" is used in conjunction with a numerical range, it modifies that range by extending the boundaries above and below those numerical values. In general, the term "about" is used herein to modify a numerical value above and below the stated value by a variance of 20%, 10%, 5%, or 1%. In certain embodiments, the term "about" is used to modify a numerical value above and below the stated value by a variance of 10%. In certain embodiments, the term "about" is used to modify a numerical value above and below the stated value by a variance of 5%. In certain embodiments, the term "about" is used to modify a numerical value above and below the stated value by a variance of 1%.

When a range of values is listed herein, it is intended to encompass each value and sub-range within that range. For example, "1-5 ng" is intended to encompass 1 ng, 2 ng, 3 ng, 4 ng, 5 ng, 1-2 ng, 1-3 ng, 1-4 ng, 1-5 ng, 2-3 ng, 2-4 ng, 2-5 ng, 3-4 ng, 3-5 ng, and 4-5 ng.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The System and Method of Distributing Digital Coupons or Promotional Data, by Using Augmented Reality (AR) 20 is shown schematically in FIG. 1. The System and Method 20 includes a data processing base module 22 containing information representing Clients; such as a Brand Signifier constituted by a trademark, copyright, or any logo or sign that signifies a specific Brand or Business. The System and Method 20 also has a data processing promotion module 24 containing promotional data. The promotional data may include a digital coupon.

The System and Method 20 has a data processing store module 26 containing information regarding saleable items available for purchase by the customers. The information contained in the store module 26 may include barcodes or SKU codes that are aligned with saleable items that are produced by a specific Brand or Business. The saleable items may include products, services, or recorded entertainment.

The System and Method 20 includes a data processing augmented reality module 28 containing visual overlays 29 for images corresponding to a Brand Signifier on saleable items contained in the store module 26. The augmented reality module 28 provides a visual overlay 29 to appear on a screen of a camera 30 when a customer directs the camera at a desired saleable item contained in the store module 26. The camera 30 may be a component of a mobile device 34. The mobile device 34 may be a smartphone. The AR module may provide a visual overlay to appear on the lense of a pair of AR Glasses, where a consumer opts to use one instead of a mobile device and directs the lense at a desired saleable item contained in the store module. The visual overlay may be a stationary image or a video.

The base module 22 records the use of the promotional data by the customer. The base module 22 tracks whether the customer views a predetermined minimum number of visual overlays 29 such that if the minimum number is viewed, then the promotional module 24 sends promotional data 25 to the customer 32. The promotional data sent to the customer, if the customer views a predetermined minimum number of visual overlays, may include a visual overlay containing a message that appears as "Coupon Earned".

Figure 2:
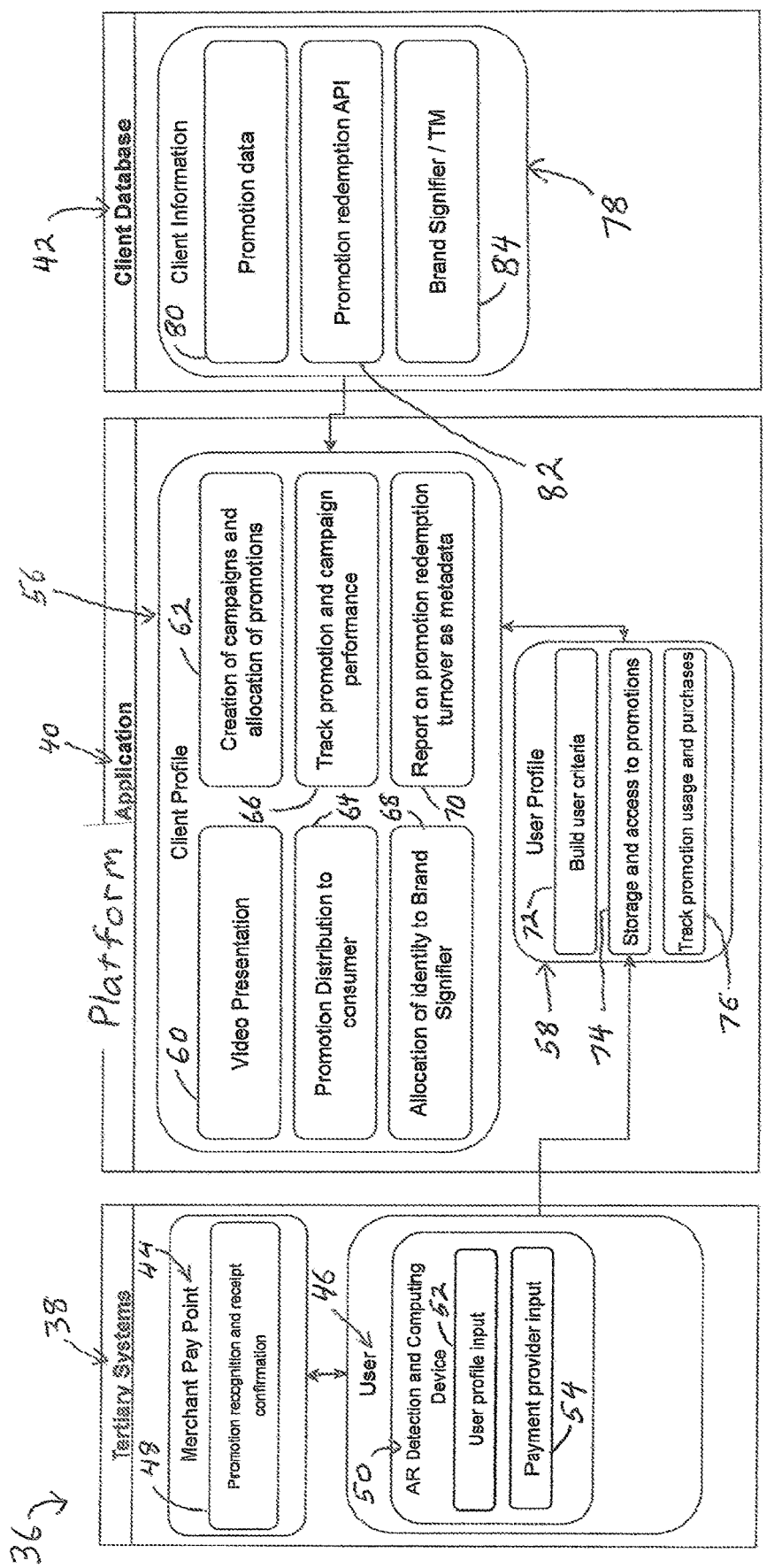
FIG. 2 is a block diagram of the system architecture for the System and Method of FIG. 1, the components of the system and apparatus being shown schematically, according to at least some embodiments described herein.

The system architecture of the System and Method of Distributing Digital Coupons or Promotional Data, by Using Augmented Reality (AR) 36 is shown in FIG. 2. The system architecture 10 includes Tertiary Systems 38, the Platform Application 40, and a Client Database 42. The Tertiary Systems 38 include a Merchant Pay Point 44 that is coupled to a User 46. The Merchant Pay Point 44 provides barcode/SKU to promotion recognition and receipt confirmation 48. The User 46 includes an AR Detection and Computing Device 50 which, in turn, includes user profile input 52 and payment provider input 54.

The Platform Application 40 includes a client profile 56 that is coupled to a user profile 58. The client profile 56 includes a video presentation 60, creation of campaigns and allocation of promotions 62, promotion distribution to the consumer 64, the tracking of promotion and campaign performance 66, allocation of identity to the Brand Signifier 68, and a report on promotion redemption turnover as metadata 70. The user profile 58 includes the building of user criteria 72, storage and access to promotions 74, and the tracking of promotion usage and purchases 76. The storage and access to promotions 74 is coupled to the User 46 such that the direction of the coupling is from the User to the storage and access to promotions. The user profile 58 is coupled to the client profile 56.

The Client Database 42 includes Client Information 78. The Client Information 78 includes promotion data 80, promotion redemption Application Programming Interface (API) 82, and Brand Signifier™ 84. The Client Information 78 is provided to the client profile 56.

Figure 3:
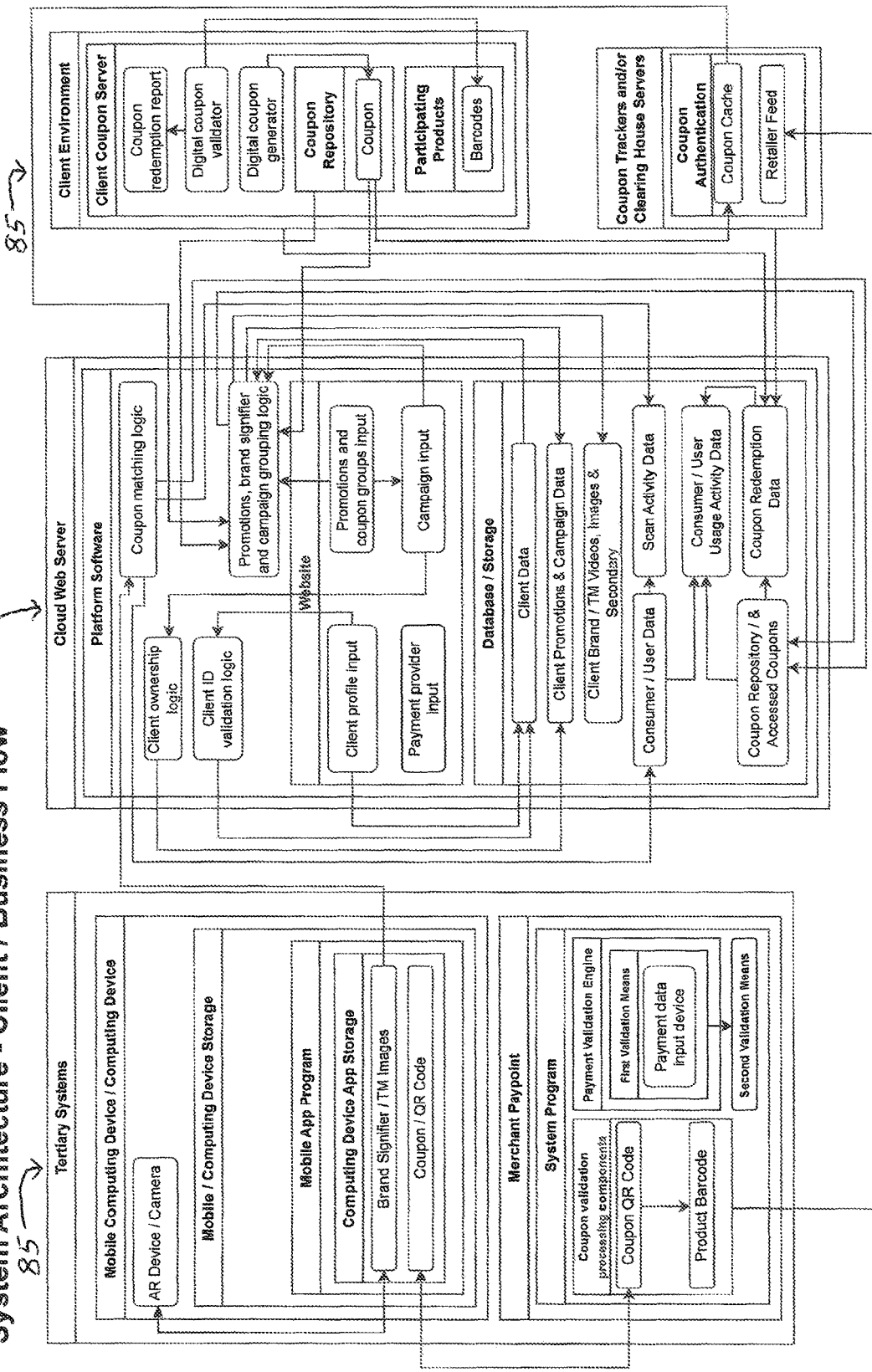
FIG. 3 is a block diagram of the system architecture for the System and Method of FIG. 1 showing the Client/Business flow, the components of the system and apparatus being shown schematically, according to at least some embodiments described herein.

The System Architecture for Client/Business Flow 85 is shown in FIG. 3. FIG. 3 shows the flow of data on Coupon Distribution Network, where the client is concerned. This is the first party to the Network as they provide the Digital Coupons to be distributed. The majority of the client data runs through the Cloud Web Server of the Network, with the point of origination being the website. The Client profile input is inclusive of the submission of any Brand Signifier constituted by a trademark, copyright, or any logo or sign that is owned by the inputting client, where such Brand Signifier does not currently exist on the Database. It is the Platform Software that runs several programming logic (engines) that we have devised to transform a random information inputted by a prospective client; into recognised client information on the system. The first two logics match the information provided by the prospective client as regards their Identity and purported IP to the information that we find on Company Registries and IP indexes. These logics work in concert to ensure that even when there are several entities that use the same Brand Signifier, for example a subsidiary in another part of the world, other entities of the same conglomerate where the IP is not owned by the Parent Company. The next stream of data to flow would be the client's connection to the environment where their digital coupons and promotions are housed. Where they are not the issuer of their Digital Coupon, a looping or adjoining connection between their systems and/or the environment of their Coupon Trackers, Distributed Coupon ledger providers, and or Clearing Houses affiliated with the Digital Coupon Ecosystem of the client. A connection does not need to be made to their Digital Coupon Issuer or publisher except where the issuer also offers them tracking, or some manner of distribution services, as the coupons will be moved to the client environment after issue. On both instances, the connection to our cloud web server must be strictly API connections. The "promotions, brand signifier and campaign grouping logic" allows for the visibility of live digital coupons on the client's environment to be associated with their different campaigns. This is also the logic that synchronizes the relevant video content uploaded on the database by the client, to the associated campaigns. The Coupon Matching logic allocates a unique number based on the consumer to the associated promotion and the client.

Once the consumer has scanned a Brand Signifier and the video content has been played, the coupon matching logic is initiated and the coupon is transferred to the mobile app program. Although fragmented, there is an ecosystem of retailers and Coupon Trackers, Distributed Coupon ledger providers, and or Clearing Houses. The usual method of tracking and corroboration is by affiliating the coupon with a specific barcode(s) or SKU(s).

Depending on the type of Digital Coupon, i.e., code, QR code, buyback, we can account for the usage in real time, or corroborate usage based on feed from the latter parts of the client's Digital Coupon Ecosystem such as Clearing Houses.

We offer a Payment Provider plugin option yet where or not this process is used the payments for the goods purchased will be between consumer and the retailer.

FIG. 3 depicts a QR code example to show the flow of data on the participating retailers to clearing houses, who in turn register an accounting of all Digital Coupons and transparency is given on the client side for corroboration of redemption whether in realtime/not.

Figure 4:
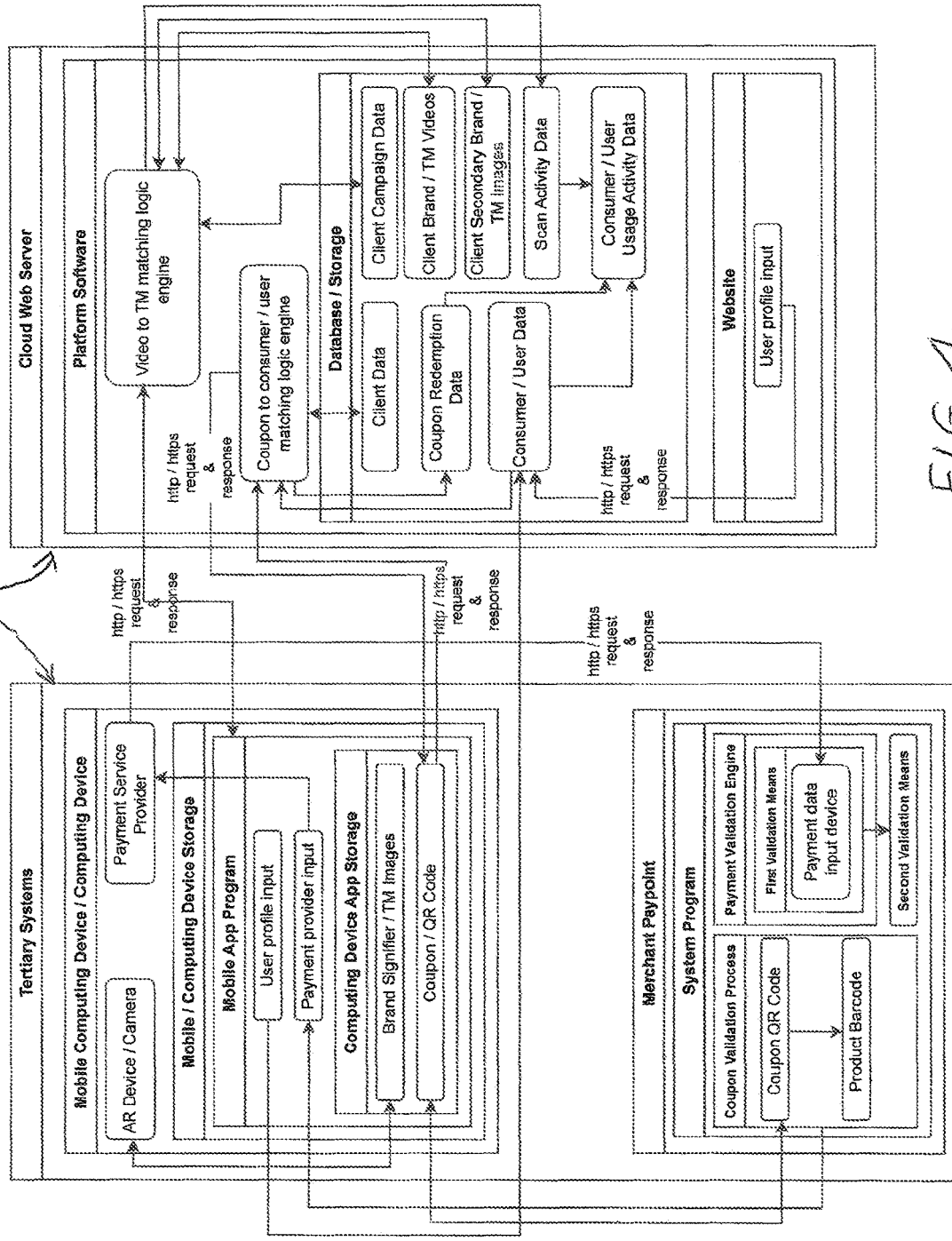
FIG. 4 is a block diagram of the system architecture for the System and Method of FIG. 1 showing the Consumer/User flow, the components of the system and apparatus being shown schematically, according to at least some embodiments described herein.

The System Architecture for Consumer/User Flow 87 is shown in FIG. 4. FIG. 4 shows the flow of data on Coupon Distribution Network, where the customer is concerned. This is the second party to the Network as they benefit from the Digital Coupons to be distributed. The majority of the client data runs in the Tertiary Systems (systems independent of control but part of our network), with the point of origination being the mobile computing device. There is a looping connection (network loop: when a network has more than one active path carrying data from the same source to the same destination) between the mobile app program of the mobile computing device and the database of the Cloud Web Server.

The consumer (user) profile input is inclusive of their full name and address. The consumer has the option to input their profile into the mobile computing device or on our website; either way this information will be fed to the registry of Consumer Data on the Database of the Cloud Web Server. They also have the option to sync with their Payment Provider app on the mobile computing device where this exists. Whenever a logo is scanned, there is a looping connection between the Camera on the Mobile Computing Device and the repository of Brand Signifiers stored on the Mobile Device Storage. When a match is made, i.e., a logo is recognised, a function is triggered to pull on the associated coupons. This then links to the Coupon to Consumer matching logic, which carries out several functions where the Consumer is concerned. Using the Consumer Profile, this Logic then checks the Consumer profile, and after verifying that the Consumer has not yet accessed the subject Coupon, it then confirms the Coupon. When the Digital Coupon is pulled it is allocated a unique number and transferred to the App Storage of the Mobile App program.

Meanwhile on recognition of the Brand Signifier, the Video to Trademark matching Logic does several functions. It confirms the match of the scanned logo in a second instance with the secondary storage of Brand Signifiers stored on the Database of the Web Server. Secondly it also pulls the video content attached to that Brand Signifier, confirming it is to associated to the the client campaign through the repository of Client Campaign data. It then sends the video content to the mobile app program. After the consumer has completed the video, the Mobile App program prompts the Video to TM matching logic, which then logs this completed scan activity in the Database. When the Consumer uses the coupon, a prompt will be received in real-time or detected by the extended Digital Coupon Distribution Network (referred to in the explanation of FIG. 3) depending on the type of Coupon redeemed. The payment process remains between the retailers and the consumer.

Figure 5:
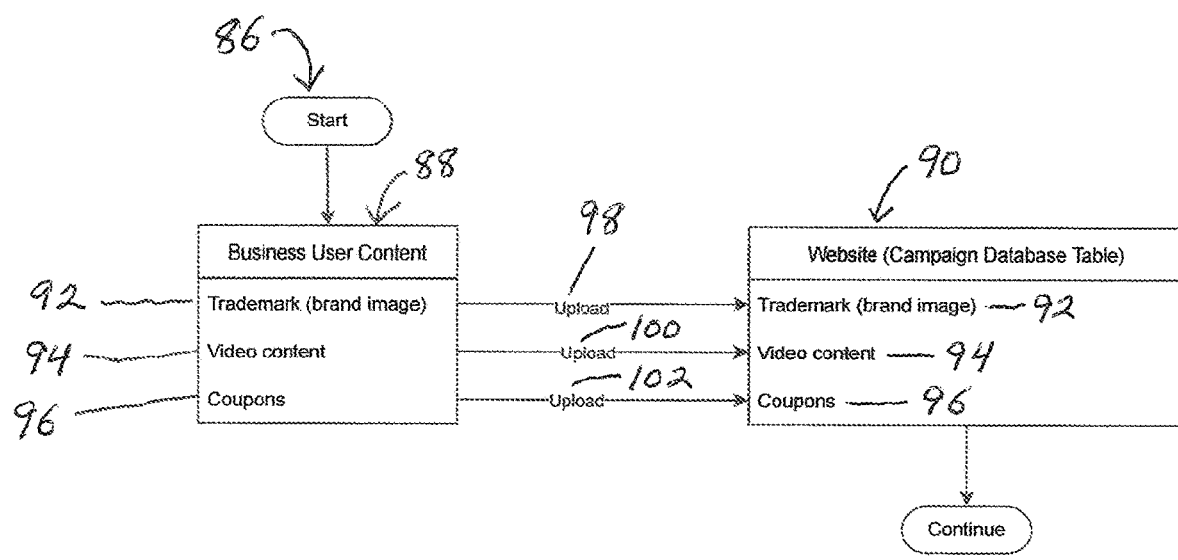
FIG. 5 is a flowchart showing the Platform data flow for the System and Method of FIG. 1, according to at least some embodiments described herein.

The Platform data flow for the system architectures 36, 85, 87 of FIGS. 2, 3 and 4 are shown in FIG. 5. The data flow 86 includes a business user content 88 and a Platform website (campaign database table) 90. The business user content 88 includes a trademark (brand image) 92, video content 94, and coupons 96 each of which is uploaded 98, 100, 102 to the Platform website 90.

Figure 6:
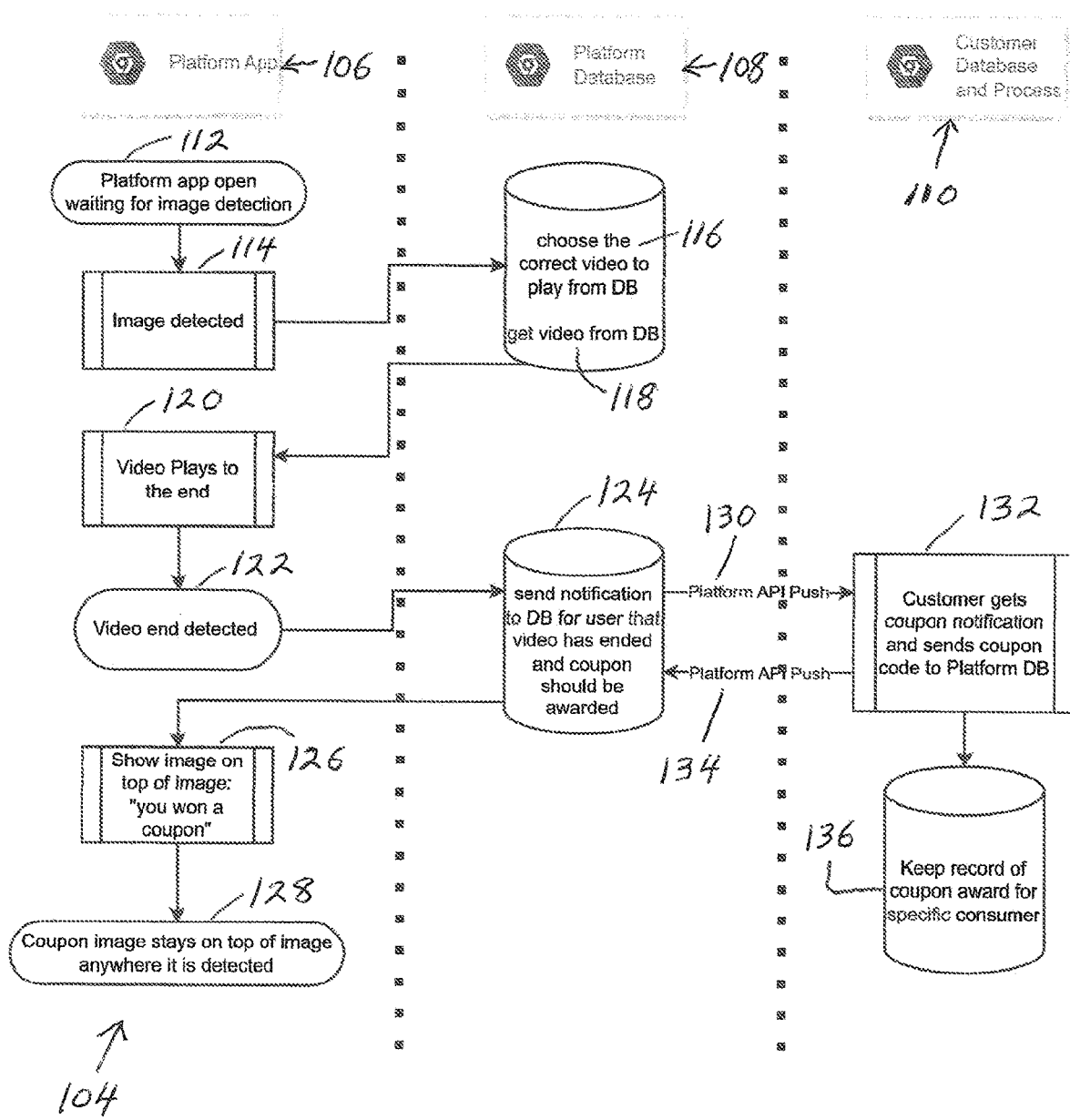
FIG. 6 is a flowchart showing the flow information and data for the System and Method of FIG. 1, according to at least some embodiments described herein.

The flow information and data across the Digital Coupon Distribution Network 104, during consumer use is shown in FIG. 6. The Distribution Network 104 includes a Platform Mobile App 106, Platform Database 108, and Customer Database and Process 110. The Platform app is open waiting for image detection 112. When an image is detected 114, the correct video to play from the database is chosen 116. Then, the video is obtained from the database 118. Next, the video plays to the end 120 whereupon the video end is detected 122. Then, notification is sent to the database for the user that the video has ended and a coupon should be awarded 124. Following this, an image is shown on top of the image that states "you won a coupon" 126. Then, the coupon image stays on top of the image anywhere it is detected 128.

Also shown in FIG. 6 are additional steps following the notification to database step 124. These additional steps include the Platform's API push 130 to a business getting coupon notification and sending the coupon code to the Platform's database 132. An API Push is a type of http/https request or response. Next, the business getting coupon notification step 132 sends the Platform's API push 134 to the notification to database step 124. Additionally, following the business getting coupon notification step 132, a record is kept of the coupon award for a specific consumer 136. Where the business is the author but not the issuer/publisher of its own digital coupons or it is the issuer; but has opted for Coupon trackers, Distributed Coupon ledger providers, Clearing Houses or the services of any such affiliates to track its coupon lifecycle, the reporting of the redemption process differs. The data processing base module will have an API feed from any Coupon Tracker, Clearing house or any such affiliate involved, to the mutual benefit of increasing visibility of the coupon Digital Coupon Ecosystem. This feed will serve to expedite the confirmation of any redemption or corroborate any redemption that is detected on the Platform to the Brand.

Figure 7:
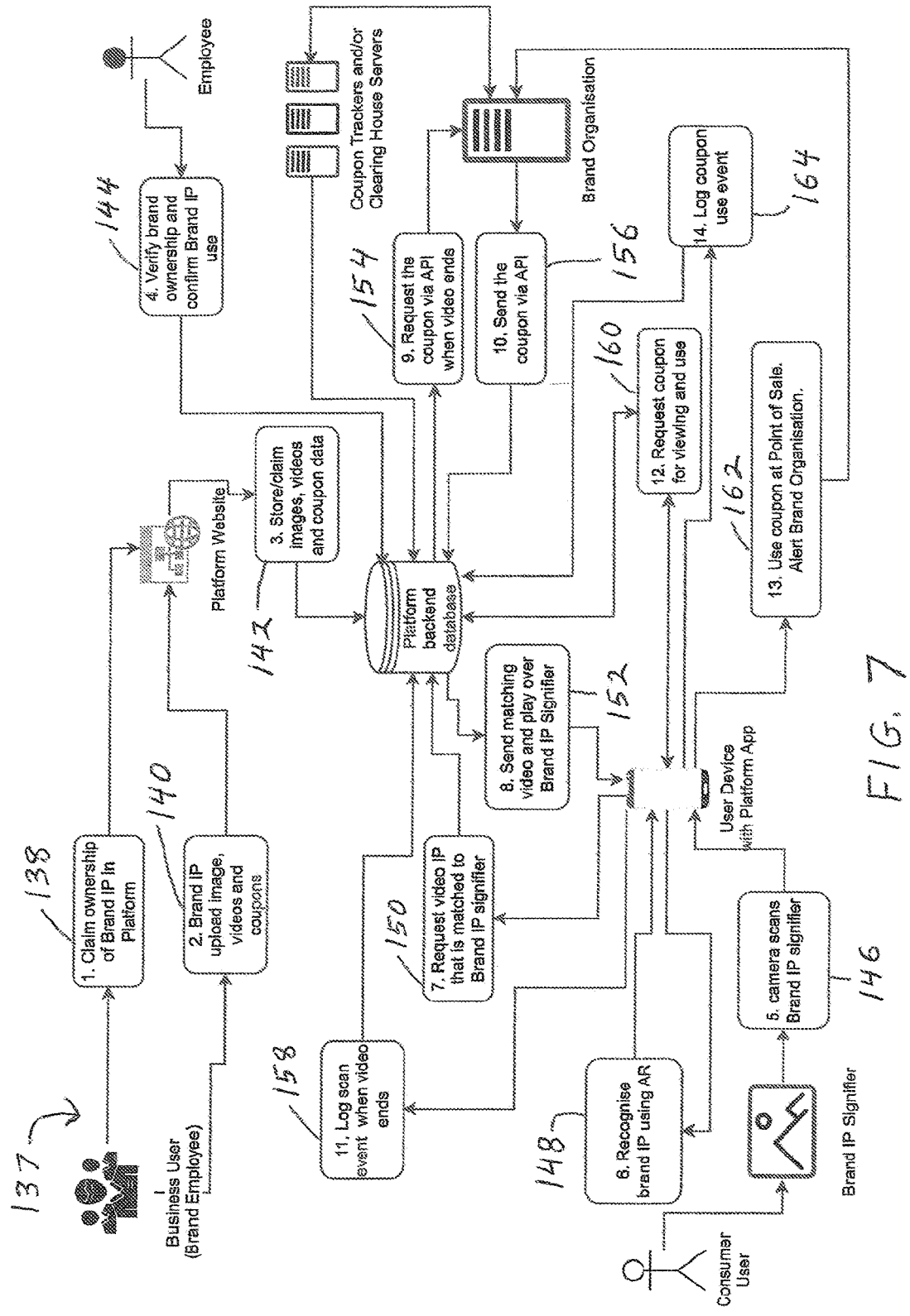
FIG. 7 is a flowchart showing the full Digital Coupon Distribution Network of FIG. 1, according to at least some embodiments described herein.

FIG. 7 shows the full Digital Coupon Distribution Network 137 from the consumer to the App to the Brand/or Coupon provider. A possible sequence of the steps indicated in FIG. 7 follows.

Claim ownership of Brand Intellectual Property (IP) in the Platform 138
Brand IP upload image, videos and coupons 140
Verify brand ownership and confirm Brand IP use 144
Store/claim images, videos and coupon data 142
Camera scans Brand IP signifier 146
Recognise brand IP using AR 148
Request video IP that is matched to Brand IP signifier 150
Send matching video and play over Brand IP Signifier 152
Request the coupon via API when video ends 154
Send the coupon via API 156
Log scan event when video ends 158
Request coupon for viewing and use 160
Use coupon at Point of Sale. Alert Brand Organisation. 162
Log coupon use event 164

Figure 10:
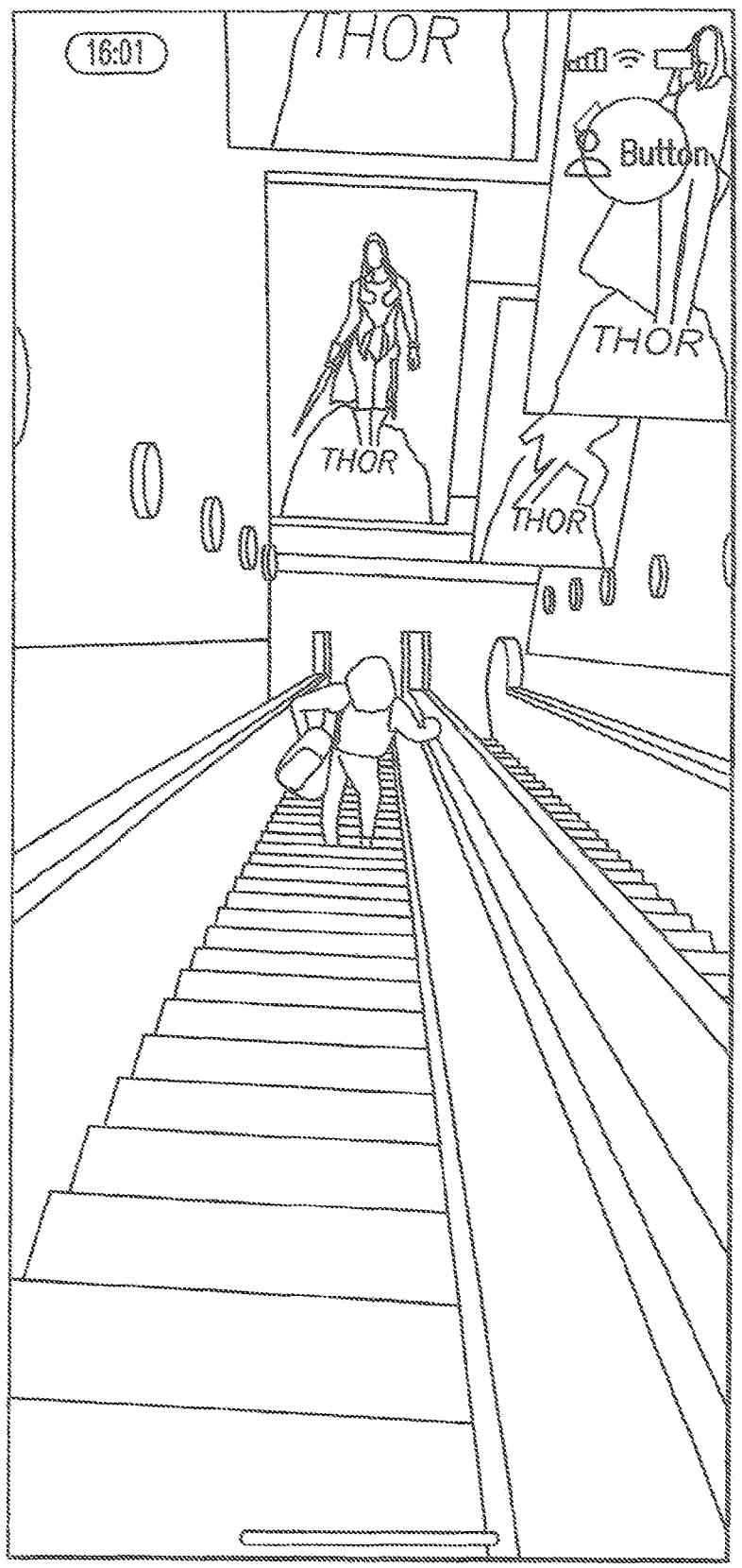
FIG. 10 illustrates a first view of the movie poster of example 1, according to at least some embodiments described herein.
Figure 14:
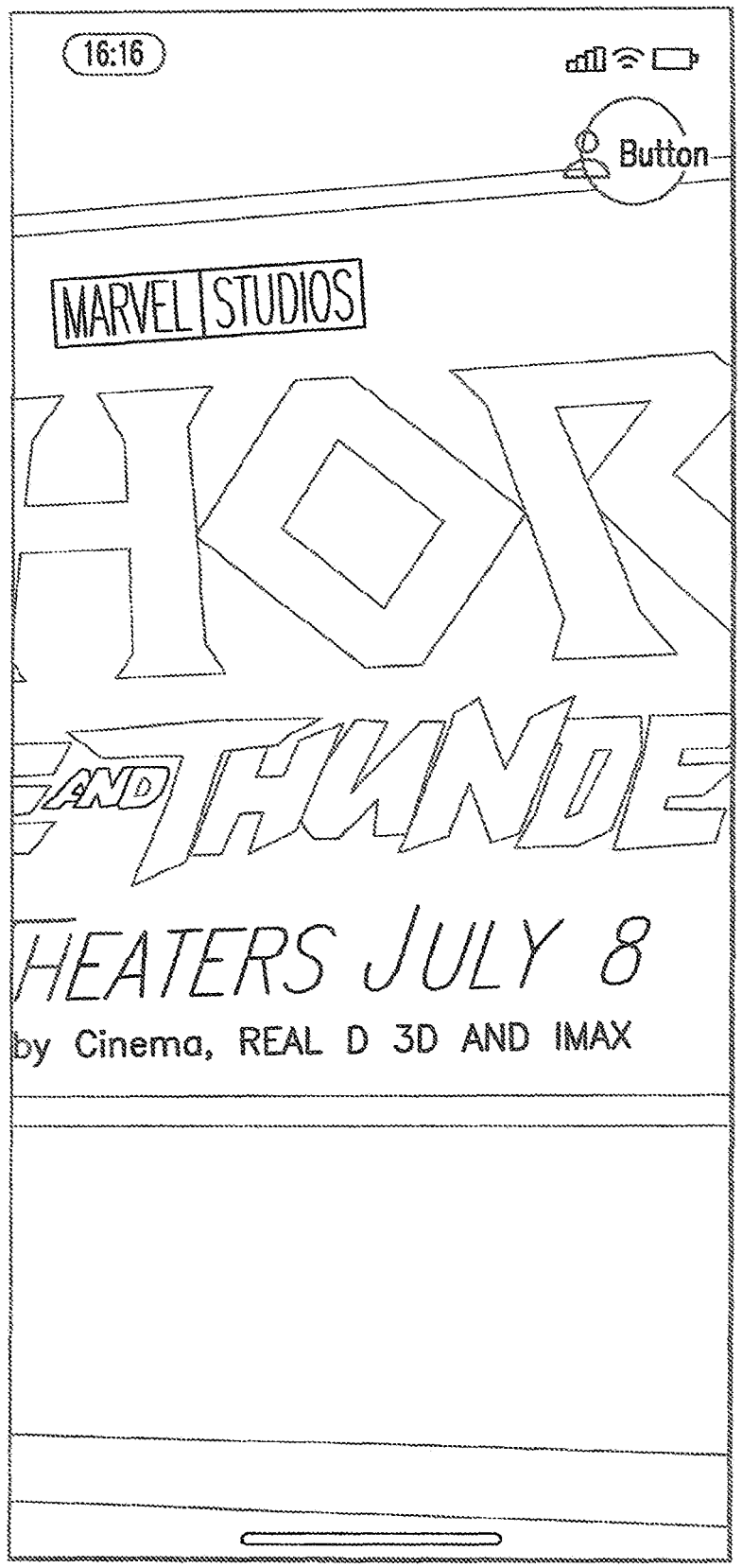
FIG. 14 illustrates a second view of the movie poster of example 2, according to at least some embodiments described herein.
Figure 15:
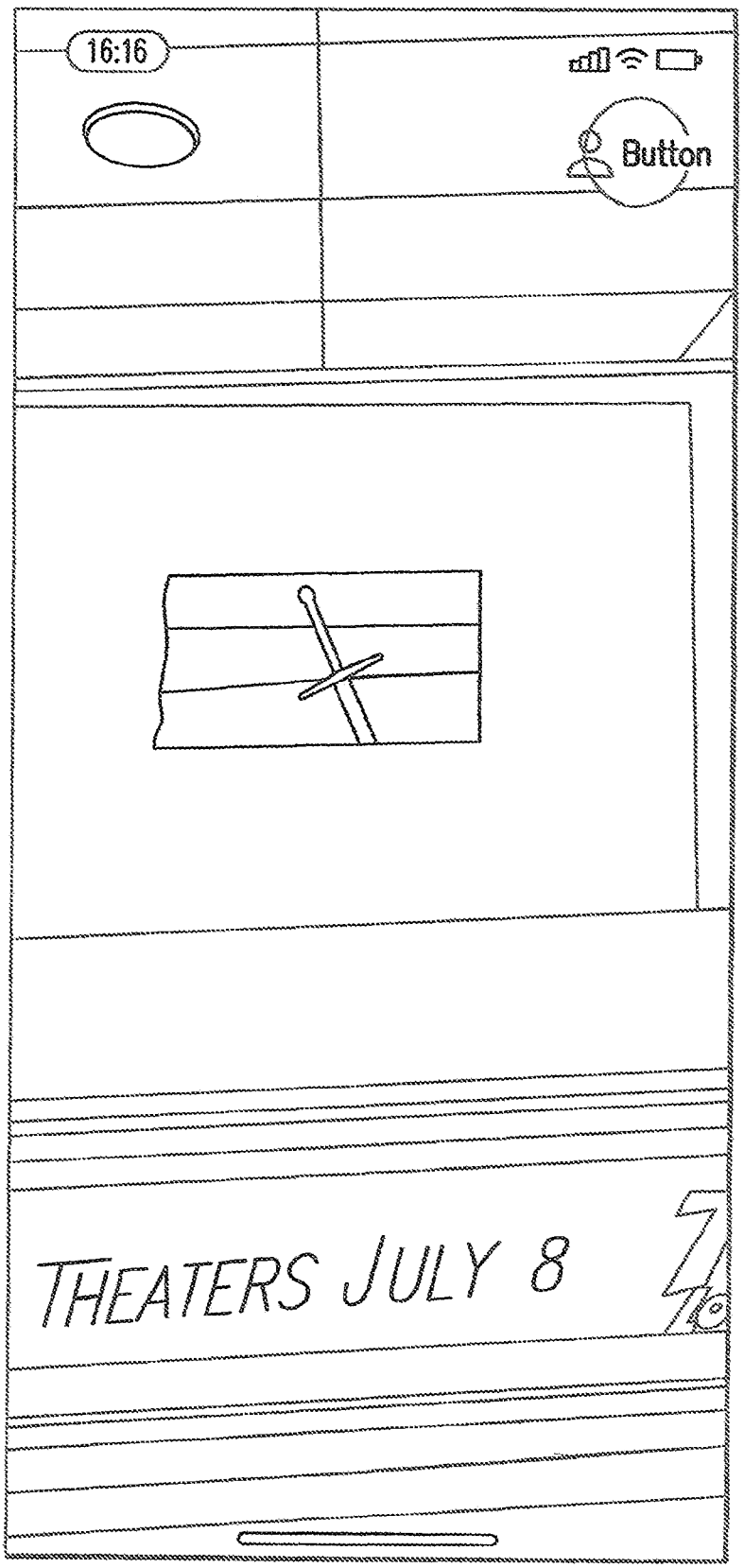
FIG. 15 illustrates a third view of the movie poster of example 2, according to at least some embodiments described herein.
Figure 16:
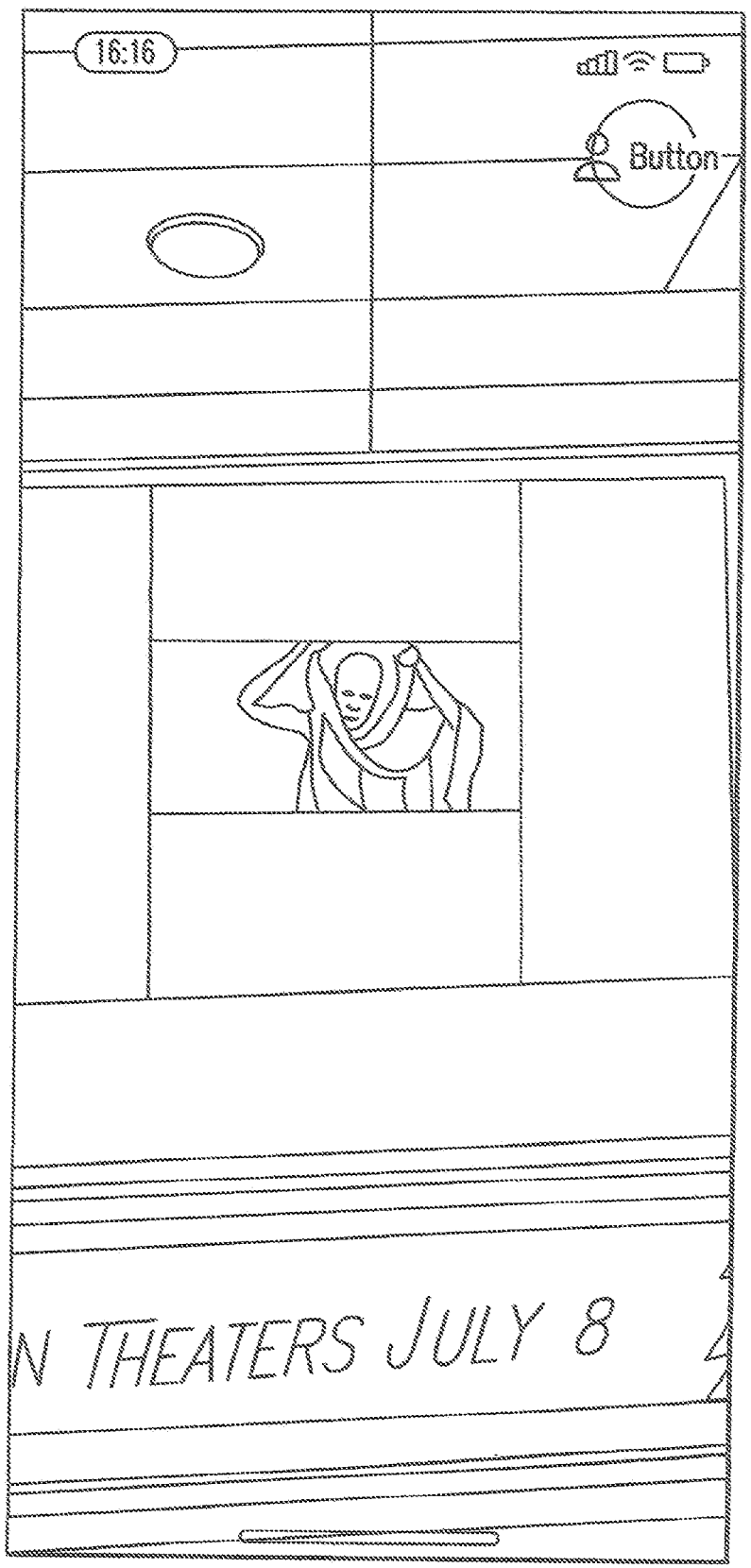
FIG. 16 illustrates a fourth view of the movie poster of example 2, according to at least some embodiments described herein.

According to one aspect of this business process, the Brand IP Signifier must be uploaded to the application database. Brand Signifier, where this process is concerned, means the trademark, copyright, or any logo or sign that is the IP of the Brand or Business. For example, the "Thor 4" movie poster is a Marvel Studios & Disney Brand Signifier, despite the character itself being public domain. In addition there can be multiple Brand Signifiers for a certain copyright or trademark. For example, there may be numerous and different movie posters for one movie (ref. FIGS. 10, 14). The applicable Brand can claim ownership of the Brand IP Signifier through the App website (Ref. FIG. 7, step 138).

The website is accessed by the Brand (holder)/business, and ownership of the Brand Signifier is claimed contingent on proof of ownership. The claimed status is updated on the back-end of the app, otherwise known as the application database. The Brand will then upload any further IP Signifiers and video content. The Brand also provides confirmation of a tranche of Digital Coupon APIs, allocated to the app (FIG. 7, steps 140, 142, 144). A tranche of Digital Coupons where this process is concerned, means the sum value of a bulk of Digital Coupons, where an API link has been initiated.

Figure 8:
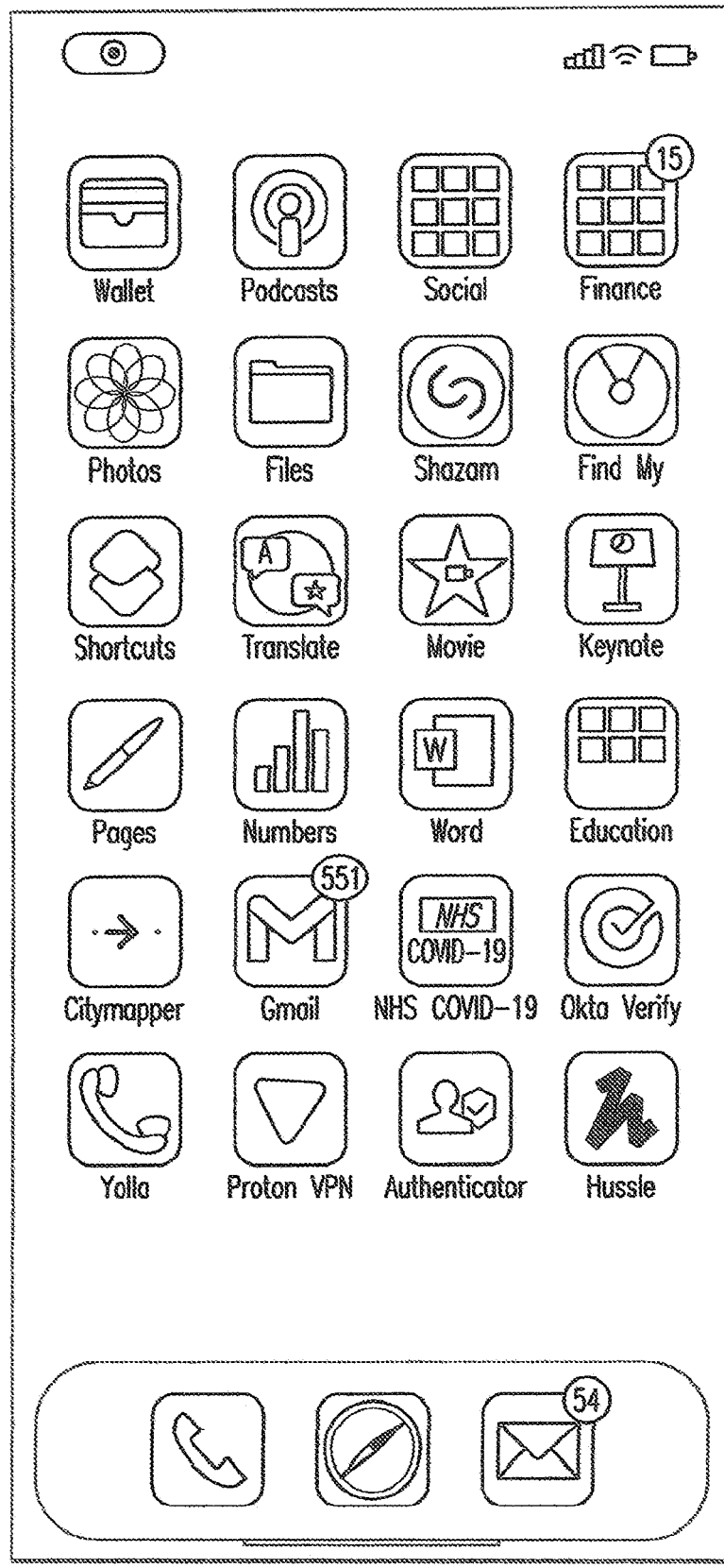
FIG. 8 illustrates the smartphone view on the consumer end, according to at least some embodiments described herein.
Figure 9:
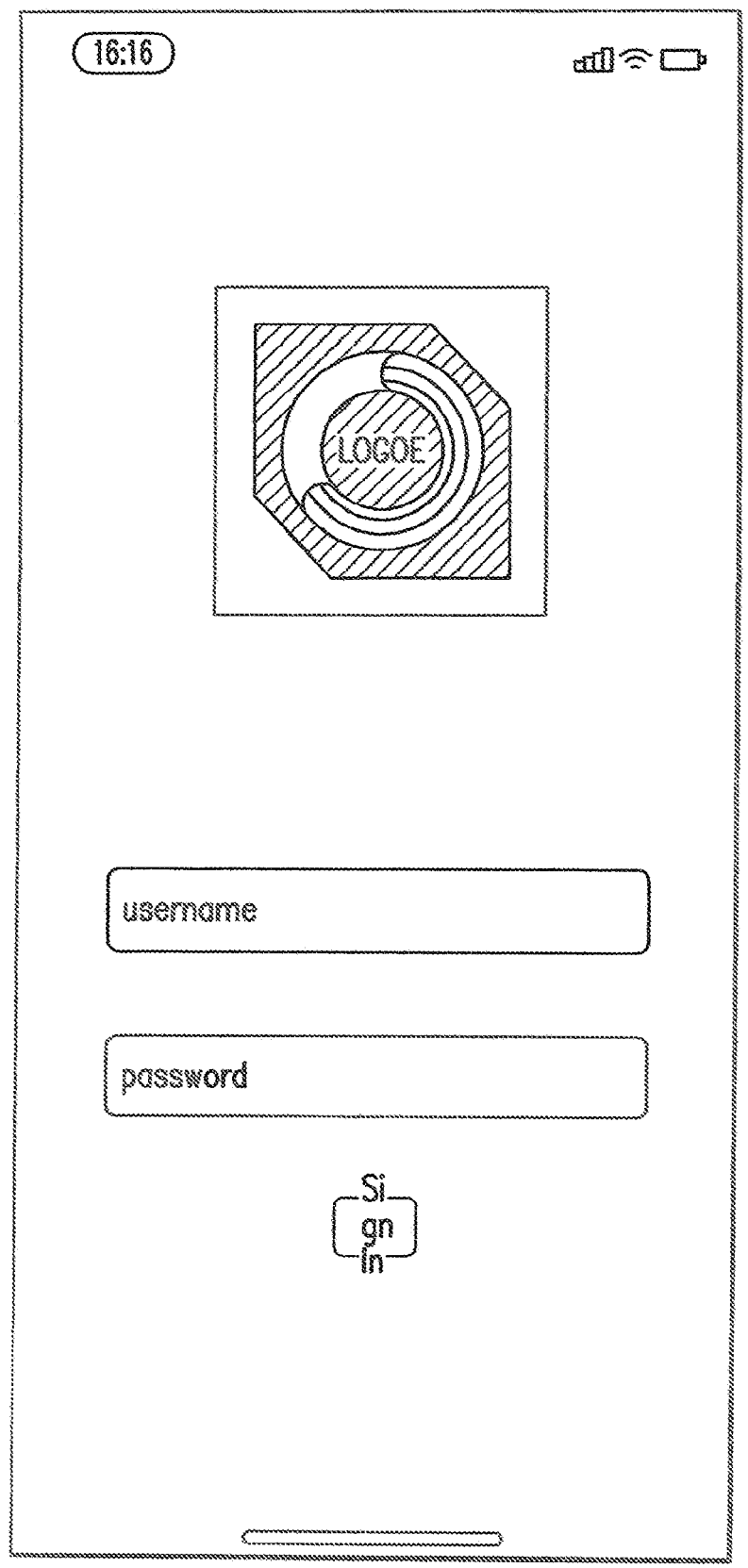
FIG. 9 illustrates the App (Platform Application) view on the consumer end, according to at least some embodiments described herein.
Figure 11:
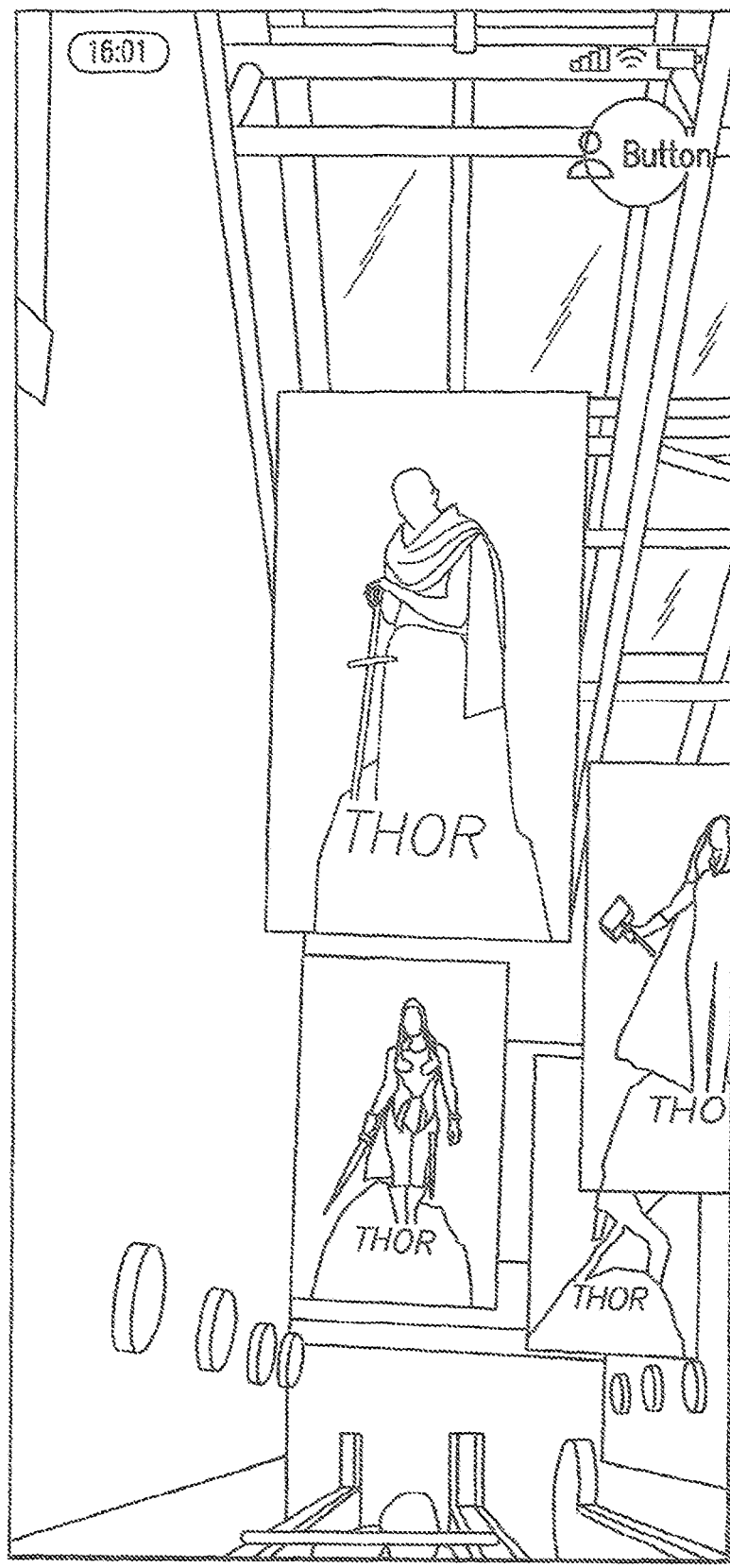
FIG. 11 illustrates a second view of the movie poster of example 1, according to at least some embodiments described herein.
Figure 12:
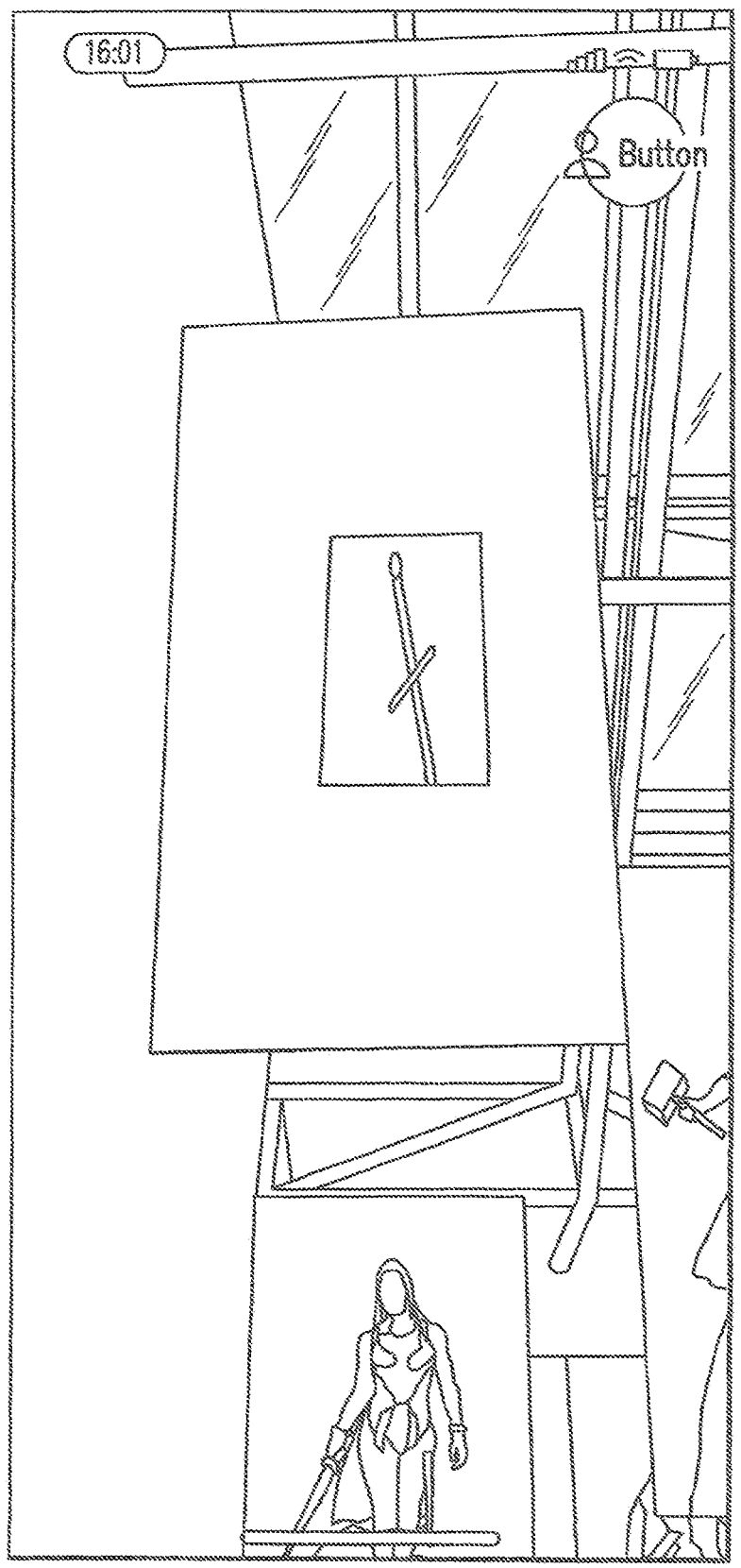
FIG. 12 illustrates a third view of the movie poster of example 1, according to at least some embodiments described herein.
Figure 13:
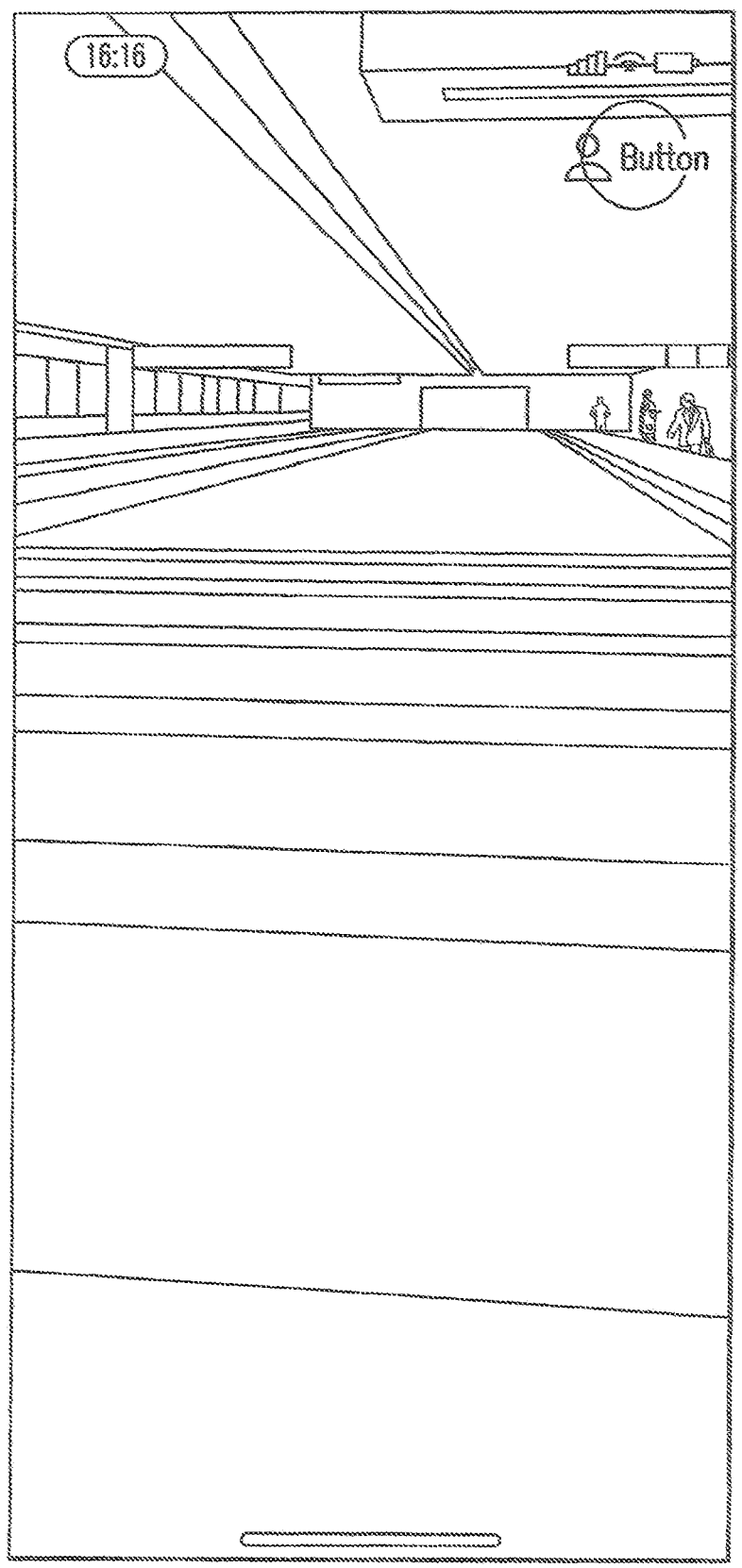
FIG. 13 illustrates a first view of the movie poster of example 2, according to at least some embodiments described herein.

The consumer can gain access to the app on any smartphone/AR Glasses device, after logging in (ref. FIGS. 8, 9). The app opens a feed to the smartphone camera/AR Glasses lense and audio output function (ref. FIG. 13). Focusing the smartphone/AR Glasses camera on IP Signifiers allows for the app to scan it at a sufficiently close proximity (ref. FIGS. 10, 11). When the camera detects an applicable IP Signifier, the app recognises the IP Signifier (ref. FIGS. 11, 14) and sends a request to the database for the video content that is associated with the IP Signifier (FIG. 6, parts 106, 108; FIG. 7, steps 146, 148, 150).

On receiving the video content, the AR function displays the video content on the frame of the IP Signifier as an overlay (ref. FIGS. 11, 12, 14, 15, 16). If the camera is taken out of focus of the IP Signifier or out of the minimum proximity to allow for the camera to detect the IP Signifier, the video content and sound stop. If the sound setting of the smartphone/AR Glasses is on silent, the setting is overridden when the app is accessed. Provided the AR video content has played its full runtime, the app Database then requests for a single coupon from the associated allocated tranche of Digital Coupons (FIG. 6, steps 122, 124, 130, 132, 134; FIG. 7, steps 152, 154, 156, 158).

Figure 17:
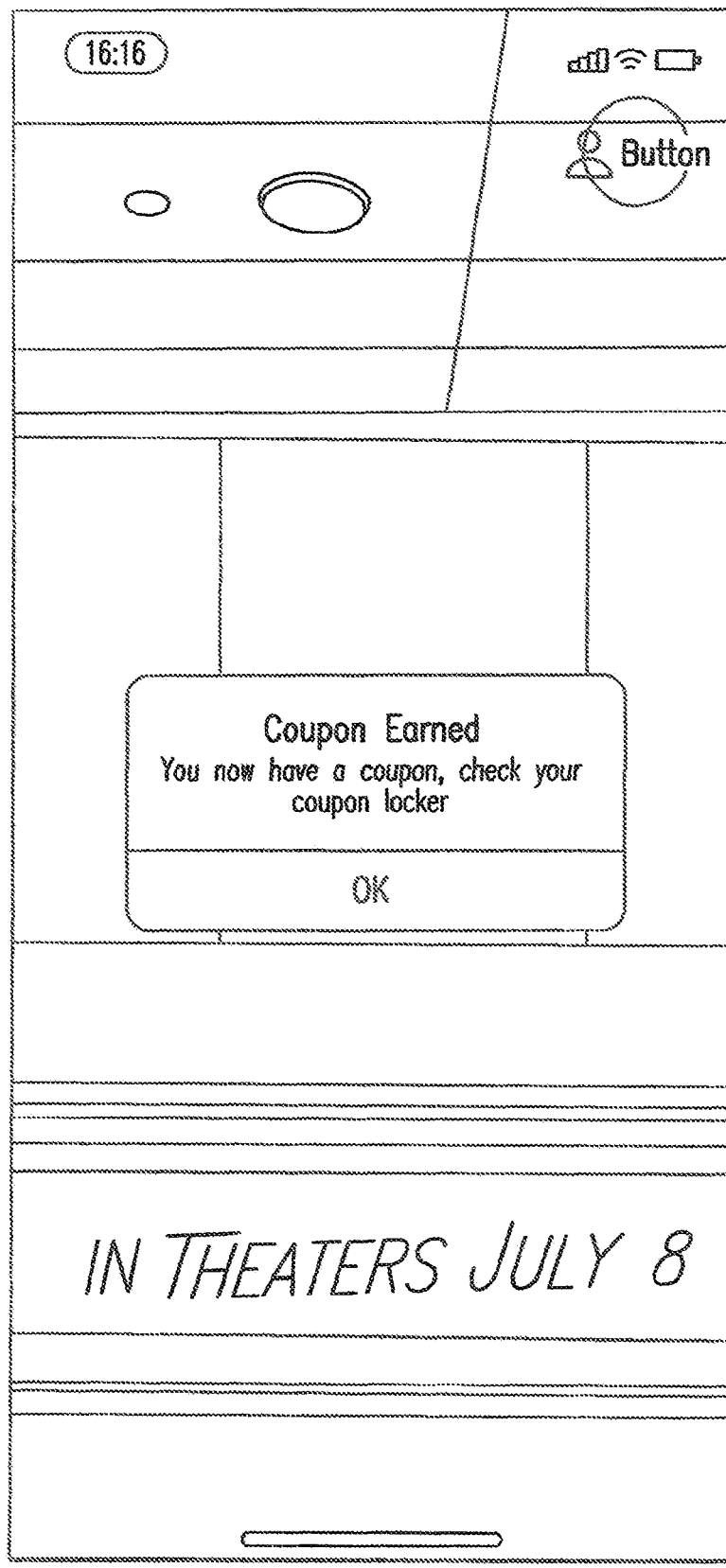
FIG. 17 illustrates a fifth view of the movie poster of example 2, according to at least some embodiments described herein.

The app requests for the Digital Coupon for viewing and use (ref. FIG. 17). The Digital Coupon is retained on the application database and remains the property of the consumer until use or the Brand discontinuation prompt, e.g. limited time/seasonal offer. The consumer can pay for goods and services with a prescribed mobile payment system on the app or with a payment processing platform for an e-commerce transaction. The discount is applied with the prescribed payment channels only. Usage of the Digital Coupon is logged and the event information is made available to the Brand (ref. FIG. 6, steps 126, 128, 136; FIG. 7, steps 160, 162, 164).

The descriptions of the various embodiments of the present process has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

Although this process has been described with a certain degree of particularity, it is to be understood that the present disclosure has been made only by way of illustration and that numerous changes in the details of construction and arrangement of parts may be resorted to without departing from the spirit and the scope of the process.

What is claimed is:

1. A distribution system and apparatus comprising:
    a data processing base module, comprising at least one processor and a memory storing executable instructions, the base module configured to process and store information representing a client or business, including intellectual property ownership records for one or more brand signifiers associated with a saleable item;
    a data processing promotion module, comprising at least one processor and a communication interface, the data processing promotion module configured to store and transmit promotional data to a customer device, the promotional data being linked to trademark ownership records of the brand signifier associated with the saleable item;
    a data processing store module, comprising a network interface, a memory storing item records, and at least one processor, the data processing store module configured to store information regarding the saleable item available for purchase by the customer and metadata associating the saleable item with its respective trademark holder, and
    a data processing augmented reality module, comprising an augmented reality display engine, a graphics processor, and a camera interface, the augmented reality module configured to:
        receive input from a camera of a mobile computing device during a looping scan;
        match a detected identifier to a brand signifier stored in a repository on a mobile device storage, the brand signifier being validated as a registered trademark owned by a trademark holder;
        trigger a function, upon recognition of the brand signifier, to retrieve visual overlays and promotional content associated exclusively with the trademark holder, the visual overlays corresponding to the saleable item contained in the store module and verified as affiliated with the trademark holder;
        provide at least one of the visual overlays to appear on a display screen of the mobile computing device when a customer directs the camera of the mobile computing device at the saleable item contained in the store module, the visual overlay comprising at least one of product-specific promotional content, trademark holder-verified advertising, or coupon offer notifications;
    the base module is further configured to:
        track whether the customer views a predetermined minimum number of the at least one of the visual overlays associated with the trademark holder;
        verify that the visual overlays viewed by the customer originate from content owned or controlled by the verified trademark holder; and
        upon determining that a predetermined minimum number of trademark-affiliated visual overlays has been viewed, automatically trigger the promotion module to transmit a digital coupon or promotional offer to the customer device, the coupon being directly linked to the trademark holder and regulated for intellectual property compliance.

2. A distribution system and apparatus according to claim 1, wherein the camera is a component of a mobile device.

3. A distribution system and apparatus according to claim 2, wherein the mobile device comprises a smartphone.

4. A distribution system and apparatus according to claim 1, wherein the information contained in the store module comprises the Brand Signifier constituted by a trademark, copyright, or any logo or sign that signifies a specific Brand or Business.

5. A distribution system and apparatus according to claim 1, wherein the base module, comprising the least one processor and the memory storing the executable instructions, is further configured to record and store data indicating a use of the promotional data.

6. A distribution system and apparatus according to claim 1, wherein the promotional data comprises a digital coupon.

7. A distribution system and apparatus according to claim 1, wherein the saleable item comprises a product.

8. A distribution system and apparatus according to claim 1, wherein the saleable item comprises a service.

9. A distribution system and apparatus according to claim 1, wherein the saleable item comprises recorded entertainment.

10. A distribution system and apparatus according to claim 1, wherein the visual overlays comprises at least one stationary image.

11. A distribution system and apparatus according to claim 1, wherein the visual overlays comprises at least one video.

12. A method of operating a distribution system and apparatus comprising:
    providing a data processing base module, comprising at least one processor and a memory storing executable instructions, the base module containing information representing a customer, including intellectual property ownership records for one or more brand signifiers associated with a saleable item;

providing a data processing promotion module, comprising at least one processor and a communication interface, the promotion module containing promotional data, the promotional data being linked to trademark ownership records of the brand signifier associated with the saleable item;

providing a data processing store module, comprising a network interface, a memory storing item records, and at least one processor, containing information regarding a saleable item available for purchase by the customer and metadata associating the saleable item with its respective trademark holder;

providing a data processing augmented reality module, comprising an augmented reality display engine, a graphics processor, and a camera interface, the augmented reality module configured to:

receive input from a camera of a mobile computing device during a looping scan;

match a detected identifier to a brand signifier stored in a repository on a mobile device storage, the brand signifier being validated as a registered trademark owned by a trademark holder;

trigger a function, upon recognition of the identifier, to retrieve visual overlays and promotional content associated exclusively with the trademark holder, the visual overlays corresponding to the saleable item contained in the store module and verified as affiliated with the trademark holder;

the augmented reality module causing the visual overlays to appear on a screen of a camera when a customer directs the camera of a mobile device at the saleable item contained in the store module, the visual overlay comprising at least one of product-specific promotional content, trademark holder-verified advertising, or coupon offer notifications; and the base module tracking whether the customer views a predetermined minimum number of trademark-affiliated visual overlays, verifying that the visual overlays viewed by the customer originate from content owned or controlled by the verified trademark holder; and upon determining that the predetermined minimum number of trademark-affiliated visual overlays has been viewed, automatically triggering the promotion module to transmit a digital coupon or promotional offer to the customer device, the coupon being directly linked to the trademark holder and regulated for intellectual property compliance.

13. A method of operating a distribution system and apparatus according to claim 12 wherein the augmented reality module causes at least one of the visual overlays to appear as a stationary image on the screen.

14. A method of operating a distribution system and apparatus according to claim 12 wherein the augmented reality module causes at least one of the visual overlays to appear as a video on the screen.

15. A method of operating a distribution system and apparatus according to claim 12 wherein the promotional data sent to the customer, if the customer views a predetermined minimum number of visual overlays, includes a visual overlay containing a message that appears as "Coupon Earned".

16. A method of operating a distribution system and apparatus according to claim 12 wherein the base module records a use of the promotional data by a customer.

* * * * *